US005223137A

United States Patent [19]

Hattori et al.

[11] Patent Number: 5,223,137

[45] Date of Patent: Jun. 29, 1993

[54] CENTRIFUGAL SEPARATION APPARATUS WITH SOLIDS DISCHARGE CONTROLLED BY RECIPROCATING BOTTOM LID

[75] Inventors: Ryuichi Hattori, Kyoto; Nobuhide Nakagawa, Kashihara, both of Japan

[73] Assignee: House Food Industrial Co., Ltd., Osaka, Japan

[21] Appl. No.: 554,345

[22] Filed: Jul. 19, 1990

[30] Foreign Application Priority Data

Jul. 20, 1989 [JP] Japan .................... 1-188019

[51] Int. Cl.[5] .................... B01D 33/06; B01D 33/52

[52] U.S. Cl. .................... 210/368; 99/403; 210/369; 210/374; 210/388; 210/DIG. 8

[58] Field of Search .................... 99/403, 407–409; 210/360.1, 369, 372, 370, 376, 388, 396, 408, 534, DIG. 8, 368, 373, 374; 494/56, 59, 258, 47, 84, 50, 52–54

[56] References Cited

U.S. PATENT DOCUMENTS

| | | | |
|---|---|---|---|
| 489,166 | 1/1893 | Proeber | 210/370 |
| 725,560 | 4/1903 | Hampl | 210/376 |
| 934,221 | 9/1909 | Schmitz | 210/370 |
| 1,903,298 | 4/1933 | Roberts | 210/368 |
| 2,078,604 | 4/1937 | Gage et al. | 210/374 |
| 2,917,008 | 12/1959 | Kipnis | 99/407 |
| 2,932,401 | 4/1960 | Tholl | 210/369 |
| 3,799,343 | 3/1974 | Lang | 210/377 |
| 3,812,775 | 5/1974 | Sijbring | 99/407 |
| 4,014,497 | 3/1977 | Spiewok et al. | 494/56 |
| 4,059,046 | 11/1977 | Yamazaki et al. | 99/405 |
| 4,209,127 | 6/1980 | Khapaev | 494/56 |
| 4,244,823 | 1/1981 | Wessel et al. | 494/56 |
| 4,406,651 | 9/1983 | Dudrey et al. | 494/56 |
| 4,406,791 | 9/1983 | Khapaev | 210/649 |
| 4,685,386 | 8/1987 | Bezon | 99/409 |
| 5,066,505 | 11/1991 | Vos et al. | 99/407 |

FOREIGN PATENT DOCUMENTS

| | | | |
|---|---|---|---|
| 998725 | 1/1952 | France | 99/405 |
| 1306757 | 2/1963 | France | 99/405 |
| 60-168554 | 11/1985 | Japan | 210/369 |
| 61-181554 | 8/1986 | Japan | 99/408 |
| 703139 | 12/1979 | U.S.S.R. | 494/47 |
| 1311782 | 5/1987 | U.S.S.R. | 494/47 |

*Primary Examiner*—Joseph W. Drodge
*Attorney, Agent, or Firm*—Mason, Fenwick & Lawrence

[57] ABSTRACT

A centrifugal separation apparatus comprises a rotatable cylindrical member including a side perforated wall and an opened bottom and a bottom lid member including a central raised portion and a side wall inclined downwardly and outwardly. The bottom lid member is moveable between an upper position in which said bottom lid member is engaged by the lower end face of said cylindrical member and a lower position in which said bottom lid member is spaced apart from the lower end of said cylindrical member to form a gap therebetween.

12 Claims, 10 Drawing Sheets

CENTRIFUGAL SEPARATION APPARATUS WITH SOLIDS DISCHARGE CONTROLLED BY RECIPROCATING BOTTOM LID

FIELD OF THE INVENTION

The present invention relates to a centrifugal separating apparatus which is particularly suitable for use in separating frying oil from fried foodstuffs.

BACKGROUND OF THE INVENTION

Japanese Patent Application Disclosure No. 61-181554 discloses a centrifugal oil separation apparatus which comprises a rotatable cylinder including a plurality of small apertures for drawing frying oil, and a rotary chip receiving member for temporally storing the frying oil, the rotary chip receiving member being located coaxially to the cylinder and including a central recess on the internal bottom wall thereof. Oily chips (e.g. small waste pieces produced from stamping) are thrown into the rotatable cylinder through the top opening thereof and temporally stored on the rotary chip receiving member. Thereafter, the chip receiving member is rotated such that the oily chips are moved from the rotary chip receiving member to the inner wall of the rotatable cylinder under the action of a centrifugal force created during rotation of the chip receiving member. The oily chips moved onto the inner wall of the rotating cylinder are urged against that inner wall under the action of a centrifugal force created during rotation of the cylinder. In such a manner, oil can be separated from the oily chips under the influence of the centrifugal force. After completion of the separating operation, the rotation of the cylinder is stopped. As a result, the chips will drop from the inner wall of the cylinder under gravity.

Japanese Utility Model Disclosure No. 60-168558 describes a centrifugal hydroextractor for separating water and/or oil from various industrial components or works such as bolts, rivets or the like. The centrifugal hydroextractor comprises a rotary cylindrical member which has top and bottom openings and an intermediate portion having a diameter larger than those of the top and bottom portions of the cylinder. When the cylindrical member is being rotated, the works placed therein are moved from the central conical-shaped guide member to the inner wall of the intermediate portion of the cylindrical member under the action of centrifugal force. Thus, water can be extracted from the works the inner wall of the cylindrical member. When the rotation of the cylindrical member is stopped, the works will drop from the inner wall of the cylindrical member onto a work sliding surface located below the cylindrical member under gravity. The works can be discharged out of the centrifugal hydroextractor through the work sliding surface.

In any event, the prior art centrifuges are adapted to rapidly move the oily parts from the central position in the rotating cylinder to the inner wall thereof. Thus, the fragile parts such as fried foodstuffs may lie easily damaged.

In the prior art centrifuges, further, the foodstuffs and works may be firmly deposited on the inner wall of the rotating cylinder, depending on the property of oil to be separated and the shape and property of the foodstuffs and works. Even if the cylinder is stopped, the foodstuffs or works may not drop from the inner wall of the cylinder under gravity. Particularly, if foodstuffs to be centrifugally treated are vacuum fried products, clogging was created by the fried products depositing on the inner wall of the cylinder. If the fried products are subjected to centrifugal force many times as they deposit on the inner wall of the cylinder, the fried products will be cooled and set too much, resulting in fragile products which may be easily damaged. Such fragile products may be highly different from the other products in the amount of oil contained therein.

In view of these problems in the prior art centrifuges, it is an object of the present invention to provide a centrifugal separating apparatus which can less damage matters subjected to the centrifugal action.

Another object of the present invention is to provide a centrifugal separating apparatus in which after fried products or oily works have been subjected to the centrifugal action, they can reliably drop the inner wall of the rotating member.

SUMMARY OF THE INVENTION

In one aspect, the present invention provides a centrifugal separating apparatus which comprises a rotatable cylindrical member having a side perforated wall and an opened bottom, and a bottom lid member moveable between an upper position in which the bottom lid member is engaged by the lower end face of the rotatable cylindrical member and a lower position in which the bottom lid member is spaced apart from the lower end face of the rotatable cylindrical member to form a gap therebetween, the bottom lid member having a central raised portion and a side wall inclined downwardly and outwardly.

Matters to be centrifugally treated are accumulated in the lower portion of a space defined by the inner wall of the rotatable cylindrical member and the side inclined wall of the bottom lid member. The matters will be rapidly moved from the lower portion of said space to the inner wall of the rotating cylindrical member. Distance through which the matters are moved can be reduced and the matters are less broken.

In the second aspect, the present invention provides a centrifugal separating apparatus as constructed according to the first aspect, further comprising doctor knife means placed substantially in contact with the inner wall of the rotatable cylindrical member, said doctor knife means being rotatable about the same axis as that of the rotatable cylindrical member.

In the third aspect, the present invention provides a centrifugal separating apparatus as constructed according to the first aspect, further comprising a ring-shaped scraper means slidable on the inner wall of the rotatable cylindrical member when the bottom lid member is moved downwardly.

In accordance with the second and third aspects, the products depositing on the inner wall of the rotatable cylindrical member can be reliably separated therefrom by the scraper means after the oil or the like has been separated from the products under the action of centrifugal force. This can effectively prevent the fried products from clogging in the centrifugal separator, from being broken due to the dropping of the products many times after centrifugally trated and from being subjected to irregularity in the amount of contained oil.

In the fourth aspect, the present invention provides a centrifugal separating apparatus as constructed according to the first aspect, wherein at least one of the rotatable cylindrical member and bottom lid member is independently rotatable.

In the fifth aspect, the present invention provides a centrifugal separating apparatus as constructed according to the first aspect, wherein the bottom lid member is returnable to its closed position with an impact.

In accordance with the fourth and fifth aspects, the cylindrical member can be closed, at its opened bottom, by the bottom lid member when the material is to be thrown into the cylindrical member. After the material has been centrifugally treated, the cylindrical member and/or the bottom lid member can be rotated independently. Alternatively, the rotating cylindrical member may be impacted by the bottom lid member moving to its closed position. In any event, such a motion can reliably cause the depositing products to drop from the inner wall of the cylindrical member. This can effectively prevent the fried products from clogging in the centrifugal separator, from being broken due to the dropping of the products many times after centrifugally treated and from being subjected to irregularity in the amount of contained oil.

DETAILED DESCRIPTION OF THE PREFERRED EMBODIMENTS

Figure 1:
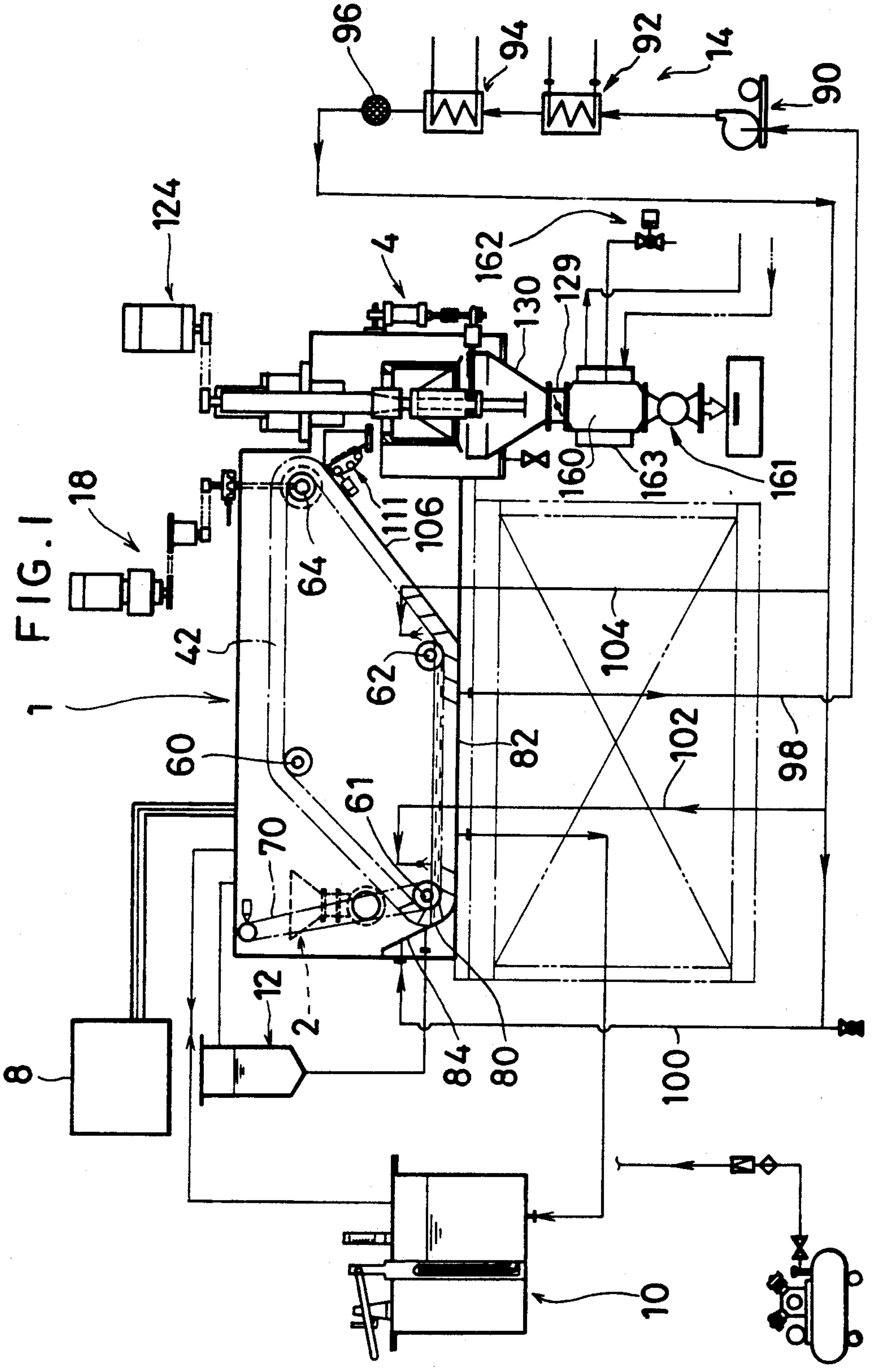
FIG. 1 is a view showing the arrangement of one embodiment of a continuous vacuum frier constructed in accordance with the present invention.

Referring now to FIG. 1, there is shown one embodiment of a continuous vacuum frier constructed according to the present invention, which comprises a vacuum frying chamber 1 for vacuum frying material; a material supply device 2 connected with the vacuum frying chamber 1; and a centrifugal separating device 4 connected with the vacuum frying chamber 1 and adapted to separate the frying oil from the fried products.

The vacuum frying chamber 1 is also connected with an evacuating unit 8 for evacuating the vacuum frying chamber 1; an oil level detector 10 for detecting the level of the oil in the vacuum frying chamber 1; an oil supply tank 12 for supplying the frying oil to the vacuum frying chamber 1; an oil temperature adjusting device 14 for adjusting the temperature of the oil in the vacuum frying chamber 1; and a belt drive device 18 for driving such as a net coveyor 42 for conveying the materials into the vacuum frying chamber 1.

As seen from FIG. 2, the material supply device 2 comprises a material hopper 30 for externally receiving material to be fried; an automatic butterfly valve 32 located under the material hopper 30 and functioning as an airtight shutter; and a horizontal pipe section 34 located below the automatic butterfly valve 32 and adapted to receive the material moved past the automatic butterfly valve 32. The horizontal pipe section 34 is connected to the vacuum frying chamber 1 through pipe means (not shown) which includes an electromagnetically actuated valve and a flow regulating valve. As the airtight shutter, the automatic butterfly valve may be replaced by any other suitable valve means such as automatic ball valve, automatic gate valve or the like.

The horizontal pipe section 34 incorporates with a throwing-in bar 37 receiprocatable therewithin, which bar 37 is attached to a hydraulic cylinder 36 functioning as a drive for the supply of materials.

A material throwing-in cover 40 is connected with the horizontal pipe section 34 at a position opposite to the hydraulic cylinder 36 through an automatic ball valve 38 which functions as a pressure shutoff valve. The material throwing-in cover 40 is of a cylindrical configuration and extends within the interior of the vacuum frying chamber 1 in a direction perpendicular to the direction of conveyance in the net conveyor 42. A downwardly directed material throwing-in opening 44 is provided in the material throwing-in cover 40 at a position above the net conveyor 42. The material throwing-in cover 40 may be connected with downwardly extending guide means (not shown) which can reliably convey the dropped materials to a material throwing-in position, preferably to a compartment in which the materials are being submerged into the frying oil.

The automatic butterfly valve 32 is automatically opened as materials are thrown in the material hopper 30. After passage of a given time period, the butterfly valve 32 is automatically closed. Subsequently, the electromagnetic valve in the pipe communicating with the vacuum frying chamber 1 is opened to gradually evacuate the interior of the horizontal pipe section 34. Thereafter, the automatic ball valve 38 is automatically opened immediately before the throwing-in bar 37 begins to move the materials to the throwing-in opening 44. As the throwing-in bar 37 is retracted after completion of the pushing-out movement thereof, the automatic ball valve 38 is closed. In such a manner, the material supply device 2 can supply material to the frier while maintaining the vacuum frying chamber 1 vacuum.

Figure 2:
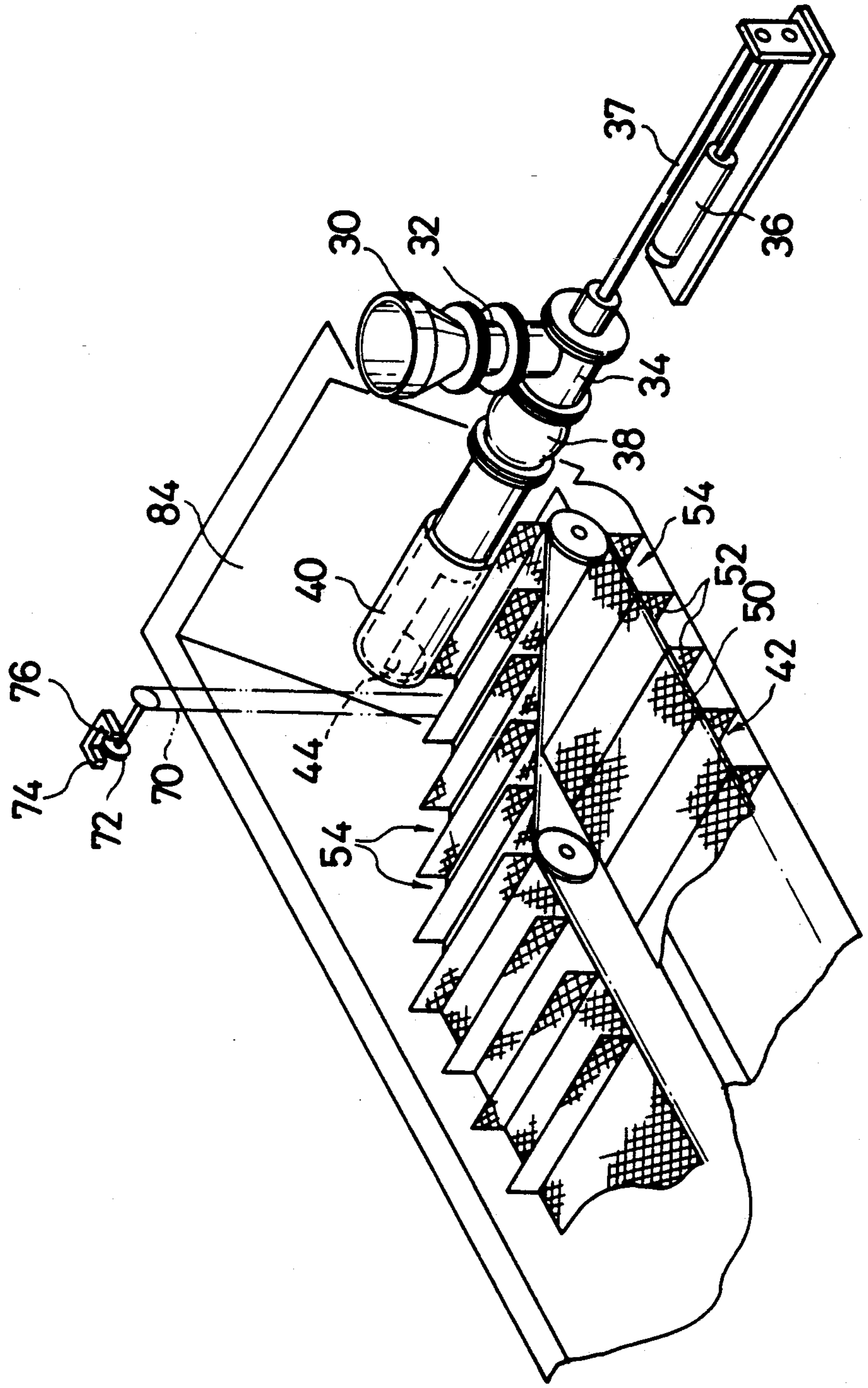
FIG. 2 is a perspective view of the material throwing-in section.

The net conveyor 42 for conveying the material in the vacuum frying chamber 1 comprises a plurality of partitioning nets 52 extending substantially outwardly from a net-like endless belt 50, as shown in FIG. 2. The width of the vacuum frying chamber 1 in a direction perpendicular to the direction of conveyance in the net conveyor 42 is substantially equal to the width of the endless belt and partitioning nets 50, 52. Thus, a plurality of compartments 54 opened outwardly will be formed on the net conveyor 42. Each of the compartments 54 receives a given amount of material. Each of the partitioning nets 52 is inclined relative to the endless belt 50 with such as angle as will be described later.

As shown in FIG. 1, the net conveyor 42 is guided by means of three guide pulleys 60, 61 and 62 and intermittently driven by means of a drive pulley 64. The net conveyor 42 runs substantially along a parallelogram-shaped path. The section of the net conveyor 42 corresponding to the bottom side of the parallelogram is submerged in the frying oil. In this bottom conveyor section, the material will be fried. The net conveyor 42 is intermittently moved one time for each time period ranged between ten seconds and ten minutes by a distance corresponding to the dimension of one compartment measured in the direction of conveyance on the net conveyor 42.

As seen from FIG. 1 and 2, the guide pulley 61 is connected with an optical rotary disc 72 which is positioned outside the vacuum frying chamber 1 and rotated through a chain 70. The optical disc 72 is disposed between light emitting means 74 and light receiving means 76. Thus, such a sensor can detect the rotational angle of the guide pulley 61 and thus the distance of conveyance of the net conveyor 42.

A curved surface 80 partially surrounds the lower portion of the guide pulley 61. The curved surface 80 has a curvature, about the rotational axis of the guide pulley 61, substantially following the locus of the forward edges of the moving partitioning nets 52. The lower end of the curved surface 80 is joined to the bottom surface of the vacuum frying chamber 1 while the upper end thereof is coupled with a slanted guide plate 84 for guiding the thrown material into each of the compartments 54. The curved surface 80 serves to secure that when each of the compartments 54 is inverted with the top opening thereof being downwardly directed, the material is easily discharged from the compartment 54 through the top opening thereof without clogging. It is preferred that the material is thrown in each of the compartment at the beginning of frying at which part of that compartment begins to be submerged into the frying oil.

The level of oil within the vacuum frying chamber 1 is sensed by the oil level detector 10 shown in FIG. 1. If the frying oil in the vacuum frying chamber 1 is consumed below a predetermined level, it is detected by the oil level detector 10 which in turn actuates an oil level controlling system (not shown). The oil level controlling system then provides a signal to the oil supply tank 12 which in turn is actuated to re-supply new frying oil. In the illustrated embodiment, the level of oil is maintained above the endless belt 50 in the horizontal path of conveyance wherein each of the compartment 54 is positioned upside down. Depending on the type of oil and the temperature of oil, however, the level of oil may be positioned below the endless belt 50.

The oil temperature adjusting device 14 maintains the frying oil at a predetermined temperature, for example, any suitable temperature ranged between 80°–120° by circulating the frying oil from the vacuum frying chamber 1 through a cooling unit 92 or heating unit 92 and filter unit 93 by an oil pump 90.

The oil temperature adjusting device 14 includes an oil discharge pipe 98 which communicates with the bottom of the vacuum frying chamber 1. The frying oil can be removed from the vacuum frying chamber 1 through the oil discharge pipe 98.

After the oil has been adjusted up to a predetermined temperature by the oil temperature adjusting device 14, part of the adjusted oil is returned on the upper portion of the slanted guide plate 84 through an oil return pipe 100. This can prevent the material from depositing on the slanted guide plate 84.

After adjusted with respect to the temperature thereof, another part of the oil is further sprayed substantially toward the guide pulley 61 located at the bottom run of the net conveyor 42. Thus, the floating material being fried can be prevented from depositing on the net conveyor 42 and also the material deposited on the net conveyor 42 can be separted therefrom. The sprayed oil portion also serves to agitate the frying oil so as to prevent any irregularity in frying. Additionally, the sprayed oil portion can add thermal energy to the body of frying oil at the beginning of the frying operation.

Still another part of the oil adjusted to the predetermined temperature is further toward the endless belt 50 at a position adjacent to the lower portion of the conveying-out ramp 106 for conveying the fried products from the vacuum frying chamber 1 to the centrifugal separating device 4 through a pipe 104, that is, near a position at which the endless belt 50 exits the frying oil. This serves to separate the fried products from the endless belt 50.

Figure 3:
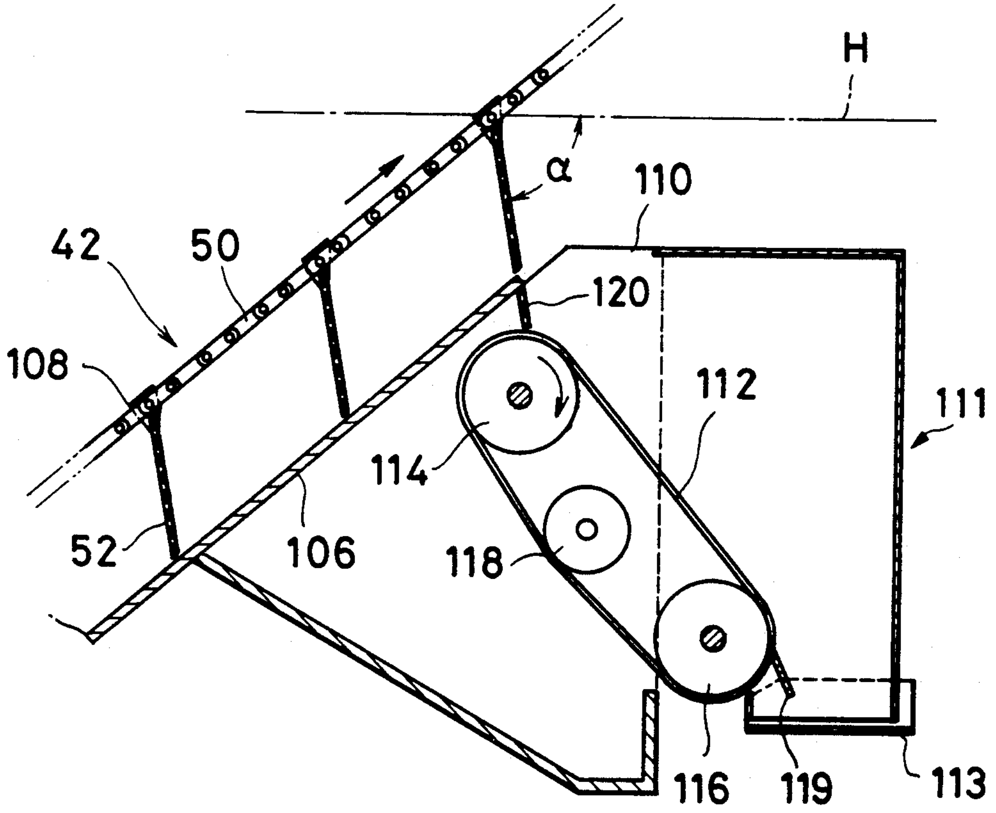
FIG. 3 is a cross-sectional view showing ramp and duct for conveying the fried products out of the frier.

As shown in FIG. 3, the endless belt 50 is spaced above the conveying-out ramp 106 and runs parallel thereto. The ramp 106 is disposed with an angle ranged between 40°–60°, relative to horizontal. Each of the partitioning nets 52 is mounted on the endless belt 50 through a fixture 108 such that the angle of the partitioning net relative to the horizontal line H, that is, the angle of conveyance slope $\alpha$ in the partitioning net is ranged between 40°–100°, preferably between 80°–90°.

Hopper means 111 is disposed below the discharge port 110 of the vacuum frying chamber 1, as shown in FIG. 3. The hopper means 111 includes an endless conveying-out belt 112 moveably supported on part of the sidewall 120 and formed of a thin and surface finished sheet of stainless steel. This endlessd belt 112 is spanned between upper and lower pulleys 114, 116 and a tension roller 118. The endless conveying-out belt 112 is engaged by a doctor knife 119 at a position wherein the belt 112 passes over the lower pulley 116. The hopper means 111 includes a shutter 113 at the lower end thereof.

Figure 4:
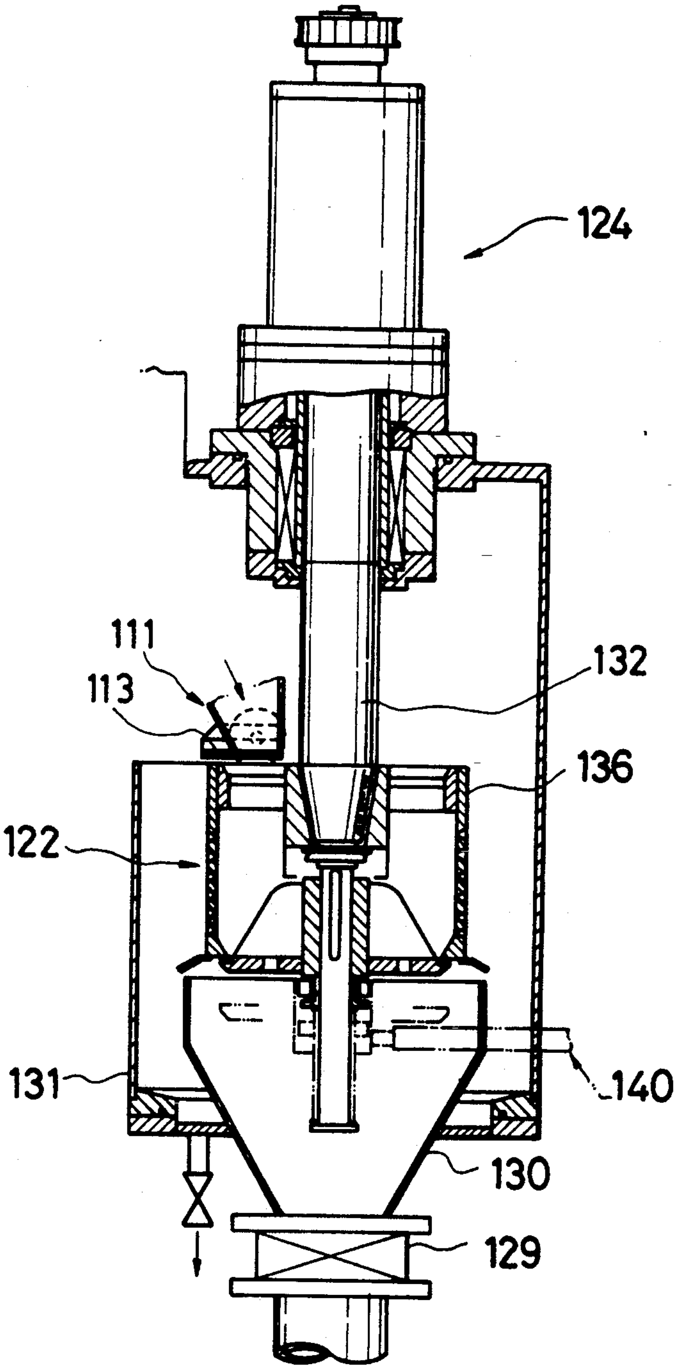
FIG. 4 is a cross-sectional view of the centrifugal separator.

The centrifugal separating device 4 is located below the hopper means 111. As seen from FIG. 4, the centrifugal separating device 4 comprises a centrifugal separator 122 receiving the fried products from the hopper means 111; a drive 124 for driving the centrifugal separator 122; a hopper 130 disposed below the centrifugal separator 122, the hopper 130 having an airtight shutter 129 at the lower end thereof; and an oil collecting barrel 131 for collecting the oil separated from the products by means of the centrifugal separator 122.

As shown in FIG. 5, the centrifugal separataor 122 is integrally mounted on a rotating drive shaft 132 which in turn is connected to a drive 124 (Fugre 4). The centrifugal separator 122 comprises a cylinder member 136 including a number of small apertures 134 formed therethrough; a bottom lid member 138 reciprocatable between a position in which the bottom lid member 138 engages the lower end portion of the cylinder member 136 without gap and another position in which the bottom lid member 138 is spaced apart from the lower end portion of the cylinder member 136 to form a gap through which the fried products can pass; and a bottom lid drive 140 for moving the bottom lid member 138 vertically between said two positions.

The bottom lid member 138 is substantially of a conical configuration and has a central raised portion and a horizontal flange 139 on the peripheral edge thereof. The bottom lid member 138 is biased upwardly under the action of a coil spring 144 which is mounted about a spring core member 142 extending downwardly from the lower end of the rotary shaft 132. Normally, the bottom lid member 138 engages the lower end face of the cylinder member 136 to close the bottom opening thereof.

The bottom lid drive 140 comprises a drive shaft 146 and a C-shaped arm member 154 mounted on the forward end of the drive shaft 146 and adapted to engage in a circumferential groove which is defined by two flanges 150 and 152 on the spring core member 142.

The operation of the centrifugal separating device 4 will now be described with reference to FIG. 5. As shown in FIG. 5(A), the bottom lid member 138 is biased against the cylinder member 136 to close the bottom opening thereof, under the biasing force of the coil spring 144. If a given amount of products are accumulated in the hopper means 111, the shutter 113 is opened to throw the products into the centrifugal separator 122. The thrown products are accumulated in a space defined by the cylinder member 136 and the bottom lid member 138 at its lower section.

Figure 5B:
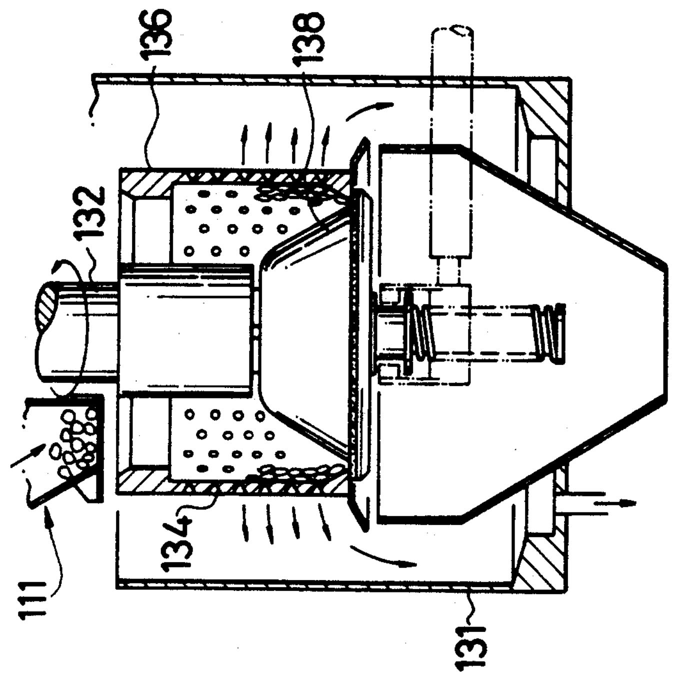
FIG. 5 illustrates the centrifugal separator at various operatiang positions.
Figure 5A:
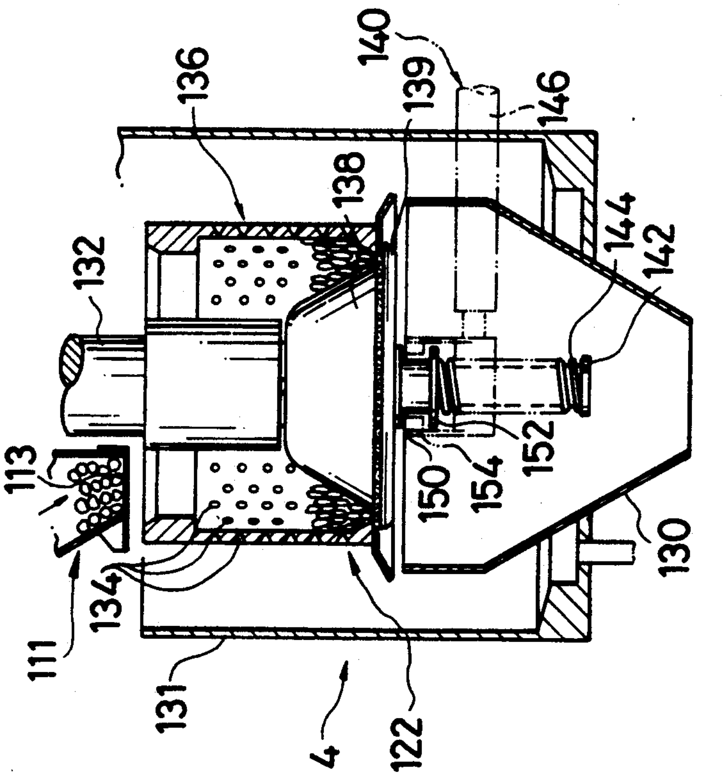

Subsequently, as shown in FIG. 5(B), the rotary drive 124 (FIG. 4) is energized to rotate the cylinder and bottom lid members 136, 138 as a unit through the drive shaft 132. For example, the rotational velocity may be set at 300–1,500 revolutions per minute. In such a manner, the products can be moved along the internal face of the cylinder member 136. Since the outer wall of the bottom lid member 138 is raised at its center and inclined outwardly, the products will not concentrate on the bottom face of the cylinder member 136, but being spread throughout the inner wall of the cylinder member. Thus, the oil can be separated from the products substantially uniformly. The separated oil flows outwardly through the small apertures 134 in the cylinder member 136 and collected in the oil collecting barrel 131. The collected oil is discharged from the oil collecting barrel 131 to any external reservoir through piping (not shown) which has airtight shutter means.

Subsequently, all the rotational motion of the rotating components is stopped. As shown in FIG. 5(C), the products are again dropped into the lower portion of the space defined by the cylinder and bottom lid members 136, 138.

Figure 5D:
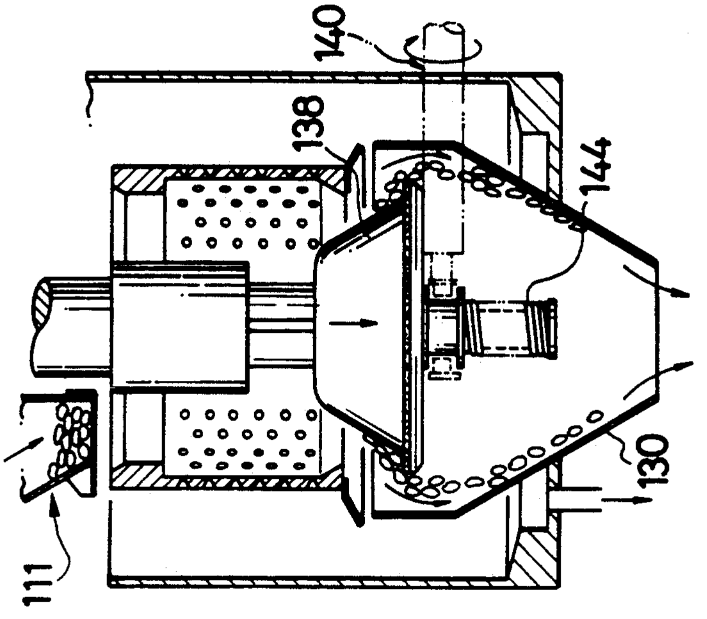
Figure 5C:
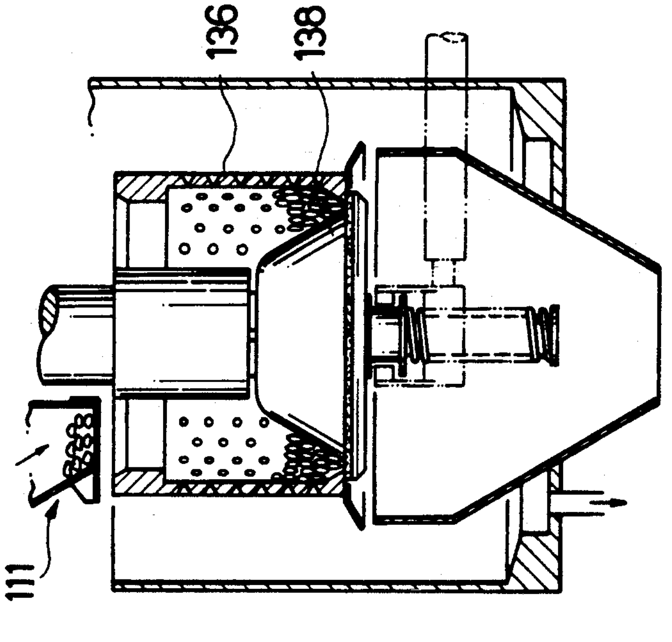

As shown in FIG. 5(D), subsequently, the bottom lid drive 140 is energized to move the bottom lid member 138 downwardly against the biasing force of the coil spring 144. As a result, said gap will be formed between the lower end face of the cylinder member 136 and the bottom lid member 138. The products may be dropped into the hopper 130 through said gap.

Thereafter, the bottom lid drive 140 is de-energized to allow the bottom lid member 138 to move upwardly under the action of the coil spring 144. Thus, the bottom opening of the cylinder member 136 may be closed by the bottom lid member 138, as shown in FIG. 5(A).

The airtight shutter 129 of the hopper 130 communicates with as product taking-out chamber 160, as shown in FIG. 1. The product taking-out chamber 160 is provided, at its lower end, with a pressure shutoff valve 161 for taking-out the products. The product taking-out chamber 160 also includes a pressure regulator 162 which is usable on returning the interior of the product tanking-out chamber from the vacuum to the normal pressure. It is preferred that the product tanking-out chamber further includes a cooling mechanism 163 which can cool and set the products such that the products will be effectively avoided from deforming on returning the product taking-out chamber from the vacuum to the normal pressure.

The process of taking out the products will now be described below.

When a predetermined amount of products are accumulated in the hopper 130, the airtight shutter 130 is opened to drop the products into the product taking-out chamber 160. Thereafter, the airtight shutter 129 is closed. The cooling mechanism 163 is then energized to cool the products up to a predetermined temperature. The pressure adjusting mechanism 162 is subsequently energized to return the internal pressure of the product tanking-out chamber 160 from the vacuum to the normal pressure. Finally, the pressure shutoff valve 161 is opened so that the products can be removed out of the frier.

Figure 6:
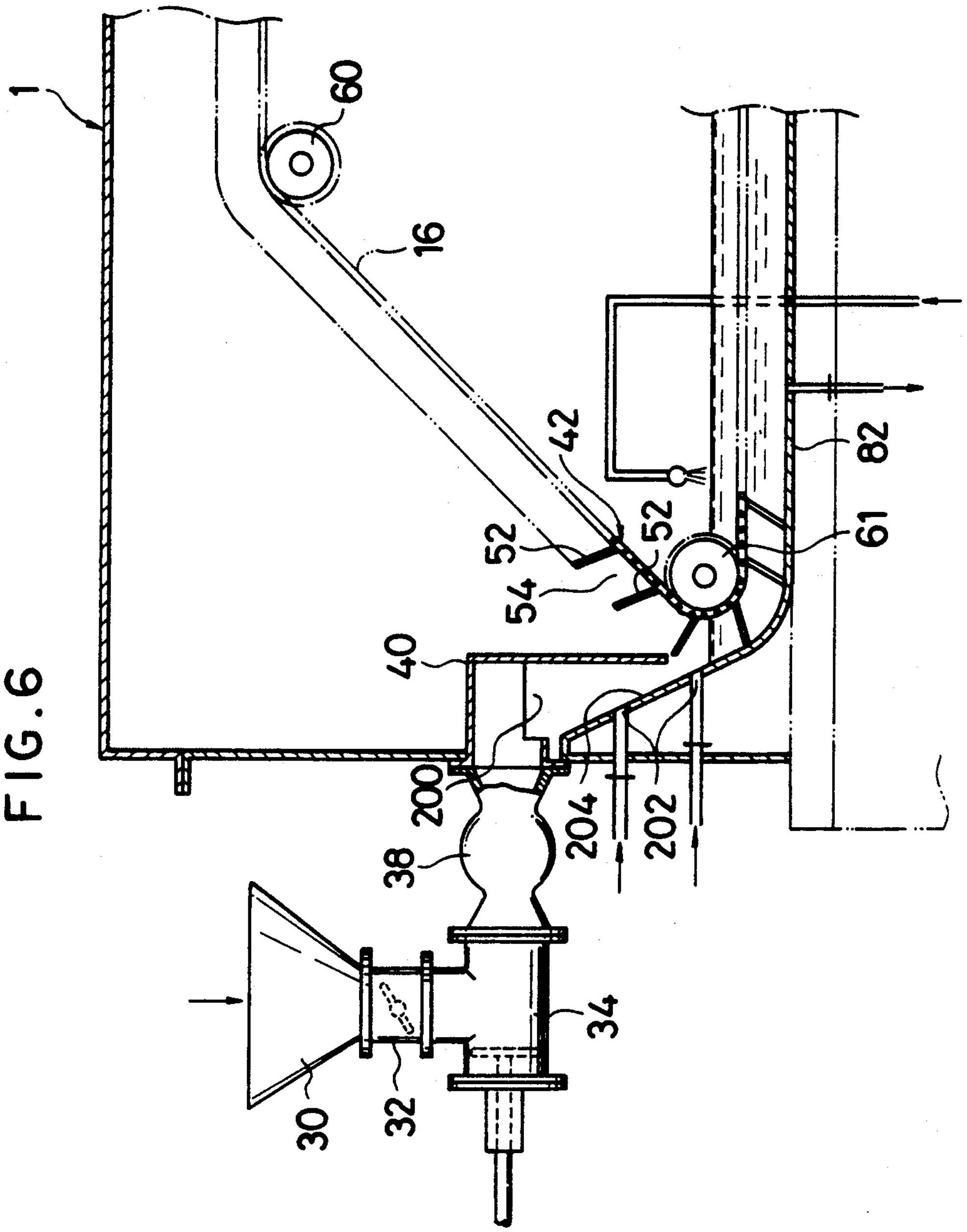
FIG. 6 is a cross-sectional view of another modified construction in the material throwing-in seciton.

Another embodiment of a material supply device is shown in FIG. 6. In this embodiment, components common to those of the first embodiment shown in FIG. 2 are designated by similar reference numerals and will not be further described.

The horizontal pipe section 34, the material throwing-in bar 37 and the material throwing-in cover 40 have a common axis which is aligned with the direction of conveyance in the endless material conveying belt 16. The ramp 204 located below the throwing port 200 of the throwing-in cover 40 is preferably provided with a plurality of oil outlet ports 202 to which the oil is fed from an oil pump 90 shown in FIG. 1. Therefore, the oil is always flowiong on the ramp 204 so that the supplied material will not accumulate thereon.

Figure 7:
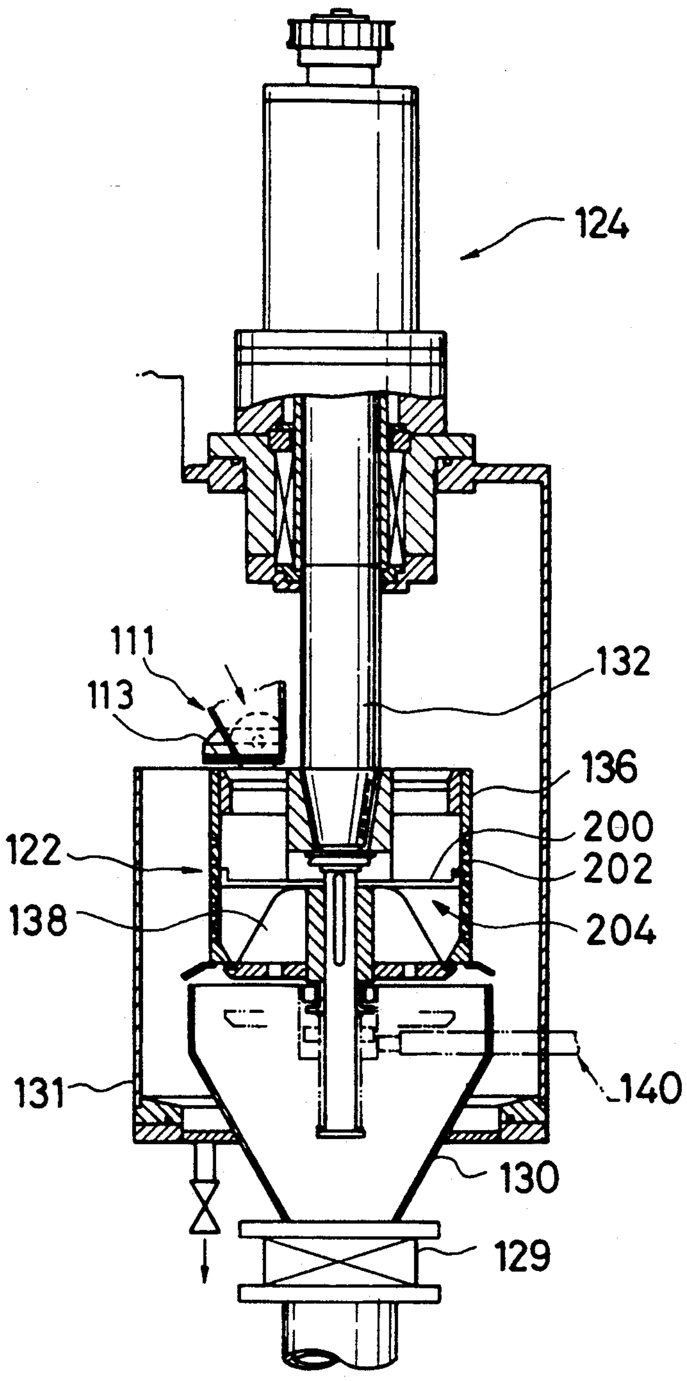
FIG. 7 is a cross-sectional view of a centrifugal separator.

FIG. 7 shows a further embodiment of the present invention, in which comprises a scraper member 204 having ribs 200 and scraping elements 202 each attached to the outer end of one of the ribs 200. The scraper member 204 is mounted on the bottom lid member 138 for rotation therewith. When the bottom lid member 138 is downwardly moved while being rotated after the oil separating operation has been completed, the scraper member 204 also is rotated with the scraping elements 202 thereof being slidably moved on the inner wall of the cylindrical member 136. As a result, products deposited on the inner wall of the cylindrical member 136 can be reliably scraped and dropped therefrom.

Figure 8:
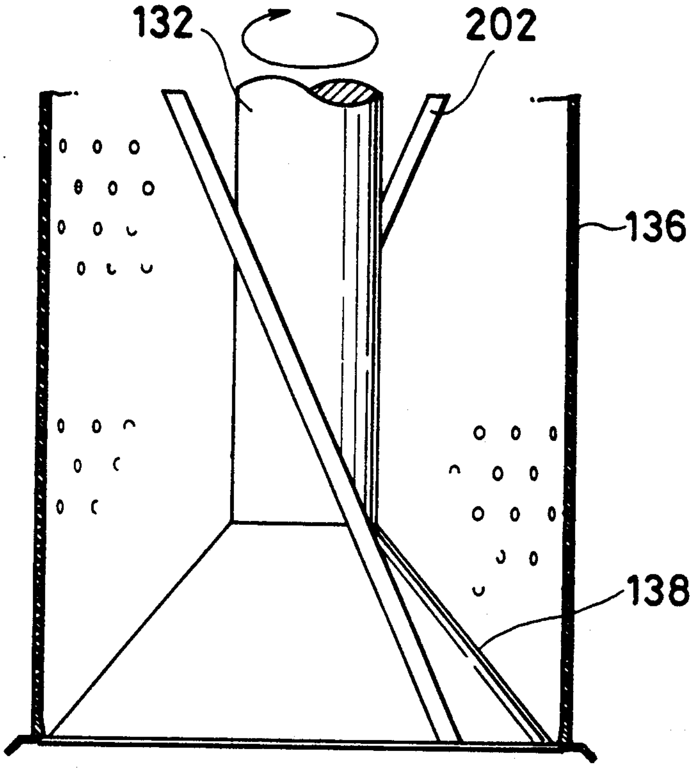
FIG. 8 is a side view showing, partially by cross-section, another example of the scraper means.
Figure 9:
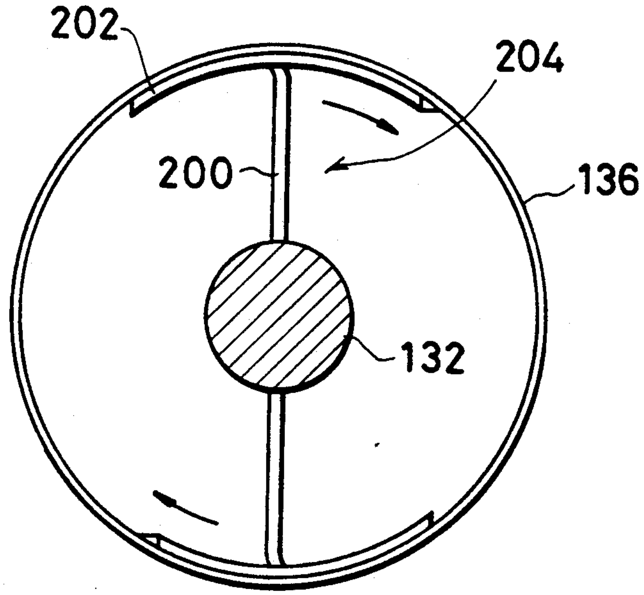
FIG. 9 is a plan view of the embodiment shown in FIG. 8.

Although the previous embodiments have been described as to the scraper member attached to the bottom lid member 138, the embodiment illustrated in FIGS. 8 and 9 provides the scraper member 204 attached to the rotating drive shaft 132. After the centrifugal oil separation has been terminated, the scraper member is rotated in a horizontal plane to scrape the products off the inner wall of the cylindrical member.

Although it has been described that the spiral scraping elements are provided in the scraper member, these scraping elements may be formed to extend linearly in a direction parallel to the rotational axis. The vertical length of each of the scraping elements is selected such that all the products can be scraped from the inner wall, depending on the rotational velocity of the bottom lid member and the velocity of downward movement of the bottom lid member. However, the scraping elements may be designed so as to scrape the products off only part of the inner wall of the cylindrical member that the products can more easily deposit thereon.

Figure 10:
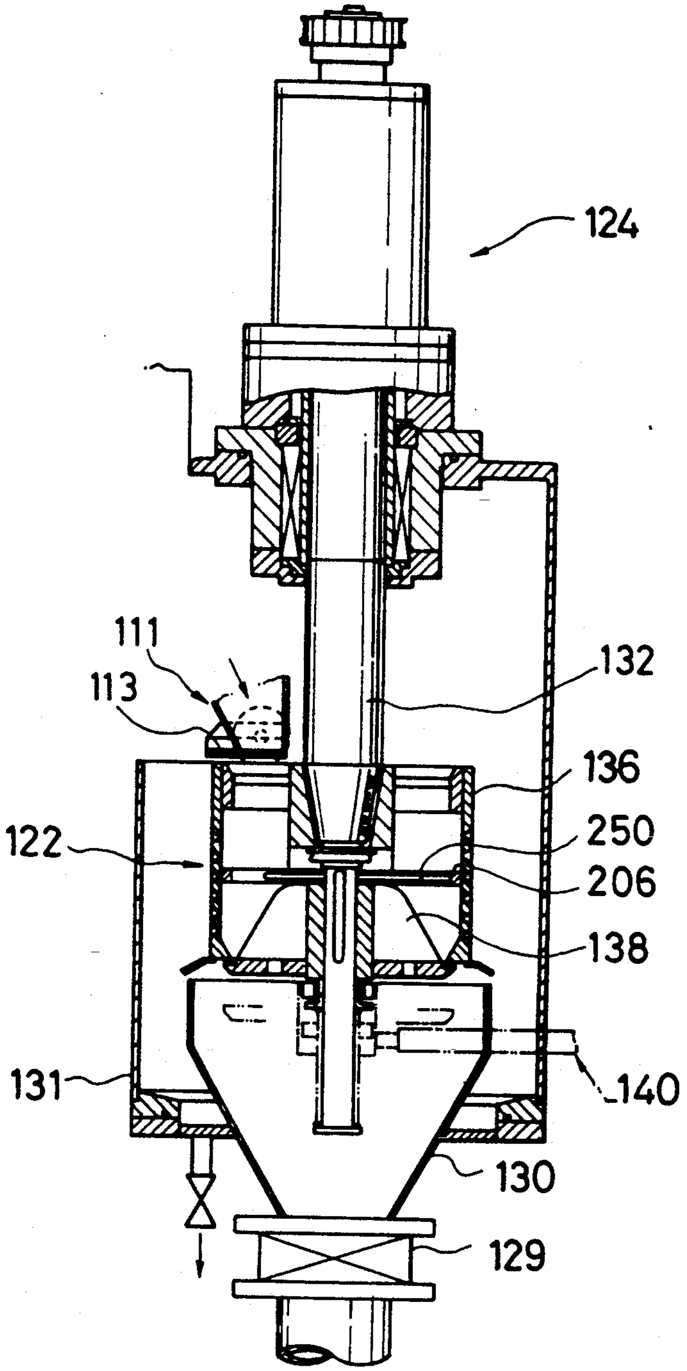
FIG. 10 is a cross-section view of still another example of the scraper means.

Although the scraper member has been described to be rotated about the same axis as that of the cylindrical member, the scraper member may be replaced by a scraping ring 206 slidably moveable on the inner wall of the cylindrical member 136. As shown in FIG. 10, the scraping ring 206 is mounted on the central raised portion of the bottom lid member 138 through three radial ribs 250. When the bottom lid member 138 is downwardly moved, a gap will be formed between the lower end face of the cylindrical member 136 and the bottom lid member 138 while at the same time the scraping ring 206 also is slidably moved and rotated downwardly on the inner wall of the cylindrical member 136. As a result, the products can be naturally dropped and forcedly scraped from the inner wall of the cylindrical member. Thereafter, the scraped products will be moved into the hopper 130 through said formed gap.

In a further preferred embodiment of the present invention, at least one of the cylindrical and bottom lid members 136, 138 can be rotated independently. After the centrifugal oil separation has been terminated, the products can be scraped from the inner wall of the cylindrical member 136 by rotating the cylindrical member 136 or the bottom lid member 138 independently.

The drive 124 for rotatably driving the centrifugal separating device 4 may include a high-performance braking device (not shown). After the centrifugal oil separation has been completed, the cylindrical and bottom lid members 136, 138 can be abruptly stopped by the braking device. As a result, the products deposited mainly on the cylindrical member 136 and partially on the bottom lid member 138 can be separated therefrom under inertia. Even if the products are not entirely separated from the cylindrical and/or bottom lid members, they can be more easily removed manually therefrom.

The arrangement may be modified such that only at least one of the cylindrical and bottom lid members 136, 138 is stopped instantaneously.

In a further embodiment of the present invention, the bottom lid member 138 may be again moved upwardly at a higher velocity and engaged by the lower end face of the cylindrical member 136 with an impact after the bottom lid member 138 has been once moved downwardly to scrape the deposited products into the hopper 130. Thereafter, the bottom lid member 138 is then moved downwardly again. In such a manner, the remaining products on the cylindrical and bottom lid members 136, 138 can be separated therefrom into the hopper 130.

In a further embodiment of the present invention, the drive 124 may include a vibrator (not shown). After the centrifugal oil separation has been terminated and the bottom lid member 138 has been moved downwardly, the cylindrical and bottom lid members 136, 138 may be vibrated such that the remaining products thereon can be more separated into the hopper 130.

We claim:

1. A centrifugal separation apparatus with solids discharge controlled by a reciprocating bottom lid, said apparatus comprising:

a cylindrical member rotatable about a vertical axis and including a lower end and a perforated vertical side wall, said vertical side wall having an inner surface, said cylindrical member having an open bottom at said lower end and an interior defined by said vertical side wall;

a bottom lid member rotatable about said vertical axis and including a lower end, a central raised portion, and an inclined side wall extending downwardly and outwardly from said central raised portion and terminating at said lower end of said bottom lid member, said bottom lid member being movable between an upper position in which said lower end of said bottom lid member is engaged with said lower end of said cylindrical member and said central raised portion and said inclined side wall are positioned within said interior of said cylindrical member, and a lower position in which said lower end of said bottom lid member is spaced apart from said lower end of said cylindrical member and at least a portion of aid inclined side wall is withdrawn from said interior of said cylindrical member; and scraper means for scraping products accumulated on said inner surface of said vertical side wall of said cylindrical member, said scraper means being rotatable about said vertical axis, and said scraper means including at least one spiral-shaped member substantially in contact with said inner wall of said cylindrical member.

2. The apparatus of claim 1, wherein said bottom lid member includes a flange extending outwardly from said inclined side wall at said lower end of said bottom lid member, and wherein said flange engages said lower end of said cylindrical member in said upper position and said inclined side wall has an outer diameter and said vertical side wall has an inner diameter which are substantially equal, whereby said lower end of said bottom lid member presents no horizontal surface on which products can accumulate.

3. A centrifugal separation apparatus with solids discharge controlled by a reciprocating bottom lid, said apparatus comprising:

a cylindrical member rotatable about a vertical axis and including a lower end and a perforated vertical side wall, said vertical side wall having an inner surface, said cylindrical member having an open bottom at said lower end and an interior defined by said vertical side wall;

a bottom lid member rotatable about said vertical axis and including a lower end, a central raised portion, and an inclined side wall extending downwardly and outwardly from said central raised portion and terminating at said lower end of said bottom lid member, said bottom lid member being movable between an upper position in which said lower end of said bottom lid member is engaged with said lower end of said cylindrical member and said central raised portion and said inclined side wall are positioned within said interior of said cylindrical member, and a lower position in which said lower end of said bottom lid member is spaced apart from said lower end of said cylindrical member and at least a portion of said inclined side wall is withdrawn from said interior of said cylindrical member; and closure means for returning said bottom lid member to said upper position with an impact;

said cylindrical member and said bottom lid member being rotatable independently of each other.

4. The apparatus of claim 3, further comprising braking means for abruptly braking said cylindrical member.

5. The apparatus of claim 3, further comprising braking means for abruptly braking said bottom lid member.

6. The apparatus of claim 3, wherein said bottom lid member includes a flange extending outwardly from said inclined side wall at said lower end of said bottom lid member, and wherein said flange engages said lower end of said cylindrical member in said upper position and said inclined side wall has an outer diameter and said vertical side wall has an inner diameter which are substantially equal, whereby said bottom lid member presents no horizontal surface on which products can accumulate.

7. A centrifugal separation apparatus with solids discharge controlled by a reciprocating bottom lid, said apparatus comprising:

a cylindrical member rotatable about a vertical axis and including a lower end and a perforated vertical side wall, said vertical side wall having an inner surface, said cylindrical member having an open bottom at said lower end and an interior defined by said vertical side wall;

a bottom lid member rotatable about said vertical axis and including a lower end, a central raised portion, and an inclined side wall extending downwardly and outwardly from said central raised portion and terminating at said lower end of said bottom lid member, said bottom lid member being movable between an upper position in which said lower end of said bottom lid member is engaged with said lower end of said cylindrical member and said central raised portion and said inclined side wall are positioned within said interior of said cylindrical member, and a lower position in which said lower end of said bottom lid member is spaced apart from said lower end of said cylindrical member and at least a portion of said inclined side wall is withdrawn from said interior of said cylindrical member; and vibrating means for vibrating at least one of said cylindrical member and said bottom lid member when said bottom lid member is in said lower position;

said cylindrical member and said bottom lid member being rotatable independently of each other.

8. The apparatus of claim 7, wherein said bottom lid member includes a flange extending outwardly form said inclined side wall at said lower end of said bottom lid member, and wherein said flange engages said lower end of said cylindrical member in said upper position and said inclined side wall has an outer diameter and said vertical side wall has an inner diameter which are substantially equal, whereby said bottom lid member presents no horizontal surface on which products can accumulate.

9. A centrifugal separation apparatus with solids discharge controlled by a reciprocating bottom lid, said apparatus comprising:

a cylindrical member rotatable about a vertical axis and including a lower end and a perforated vertical side wall, said vertical side wall having an inner surface, said cylindrical member having an open bottom at said lower end and an interior defined by said vertical side wall;

a bottom lid member rotatable about said vertical axis and including a lower end, a central raised portion, and an inclined side wall extending downwardly and outwardly from said central raised portion and terminating at said lower end of said bottom lid member, said bottom lid member being movable between an upper position in which said lower end of said bottom lid member is engaged with said lower end of said cylindrical member and said central raised portion and said inclined side wall are positioned within said interior of said cylindrical member, and a lower position in which said lower end of said bottom lid member is spaced apart from said lower end of said cylindrical member and at least a portion of said inclined side wall is withdrawn from said interior of said cylindrical member; and scraper means for scraping products accumulated on said inner surface of said vertical side wall of said cylindrical member, said scraper means being rotatable about said vertical axis, and said scraper means including at least one linear member substantially in contact with said inner wall of said cylindrical member for scraping a product off of said inner wall.

10. The apparatus of claim 9, wherein said bottom lid member includes a flange extending outwardly from said inclined side wall at said lower end of said bottom lid member, and wherein said flange engages said lower end of said cylindrical member in said upper position and said inclined side wall has an outer diameter and said vertical side wall has an inner diameter which are substantially equal, whereby said bottom lid member presents no horizontal surface on which products can accumulate.

11. The apparatus of claim 9, further comprising braking means for abruptly braking said cylindrical member.

12. The apparatus of claim 9, further comprising braking means for abruptly braking said bottom lid member.

* * * * *